(12) United States Patent
Schwengler

(10) Patent No.: US 7,177,546 B1
(45) Date of Patent: Feb. 13, 2007

(54) TIME DIVISION MULTIPLEXED OPTICAL WIRELESS POINT-TO-MULTIPOINT LINKS

(75) Inventor: Thomas Schwengler, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 710 days.

(21) Appl. No.: 10/020,310

(22) Filed: Dec. 12, 2001

(51) Int. Cl.
H04B 10/00 (2006.01)

(52) U.S. Cl. .......................... 398/118; 398/47; 398/52; 398/75

(58) Field of Classification Search ........ 398/118–131, 398/135, 98, 47, 52, 75; 342/386
See application file for complete search history.

(56) References Cited

U.S. PATENT DOCUMENTS

| | | | | | |
|---|---|---|---|---|---|
| 3,662,180 A | * | 5/1972 | Jorgensen et al. | ...... | 342/386 |
| 5,995,267 A | * | 11/1999 | Paoli | ...... | 359/204 |
| 6,438,148 B1 | * | 8/2002 | Hui et al. | ...... | 372/22 |
| 6,509,989 B1 | * | 1/2003 | Tsumori | ...... | 398/135 |
| 6,687,036 B2 | * | 2/2004 | Riza | ...... | 359/204 |
| 6,711,314 B1 | * | 3/2004 | Mori et al. | ...... | 385/17 |
| 6,760,512 B2 | * | 7/2004 | Pepper | ...... | 385/27 |
| 2002/0154354 A1 | * | 10/2002 | Raj et al. | ...... | 359/124 |

* cited by examiner

Primary Examiner—David C. Payne
(74) Attorney, Agent, or Firm—Townsend and Townsend and Crew LLP

(57) ABSTRACT

A system for time-dividing an optical signal is provided. The system time-divides a signal and reflects and/or refracts the signal using a time-dividing device to multiple receivers. By using time-division, the full signal is sent to each receiver designated to receive the signal during a certain time period. A cost effective and efficient system is provided by time-dividing the optical signal.

20 Claims, 4 Drawing Sheets

TIME DIVISION MULTIPLEXED OPTICAL WIRELESS POINT-TO-MULTIPOINT LINKS

BACKGROUND OF THE INVENTION

The present invention generally relates to broadband communications and more specifically to a system for receiving and transmitting optical signals.

With the advent of the internetwork of networks generally referred to as the Internet, more and more users desire broadband access from their homes or offices. With the increasing popularity of the Internet, numerous applications have been developed and an amazing amount of content has been produced for the Internet. As the complexity of the content and applications accessed on the Internet increases, users increasingly desire high speed access to the Internet, such as broadband access. While some solutions, such as Digital Subscriber Lines (DSL) and cable modems, have enabled users to experience broadband service, providing the services to multiple users becomes costly and burdensome.

One way of providing broadband service is with multiple point to point laser links, which use one laser source and one receiver for each user receiving the service. Thus, point to point broadband service requires a separate transmitter for each receiver. Accordingly, the use of point to point links for every person desiring broadband service is not feasible with the number of users desiring the service.

A Passive Optical Network (PON) may be used to provide broadband service. A PON includes a passive device that splits a signal between multiple devices. However, the device is passive and the original power of the signal is split between the multiple devices. Thus, if the signal is split between two devices, the two signals would have half the power of the original signal. The split signals are then weaker in intensity and cannot travel as far or as reliably as the original signal. A PON also transmits information for all of the multiple devices to one device. The device then decodes the part of the information that is for the device. Security then becomes a concern because devices receive information that is for other devices.

BRIEF SUMMARY OF THE INVENTION

In one embodiment, a system for time-dividing an optical signal is provided. The system time-divides a signal and reflects and/or refracts the signal using a time-dividing device to multiple receivers. By using time-division, the full signal is sent to each receiver designated to receive the signal during a certain time period. A cost effective and efficient system is provided by time-dividing the optical signal.

In one embodiment, a system for transmitting an optical signal to a plurality of receivers is provided. The system comprises: an optical transmitter for transmitting the optical signal, wherein the optical signal is allocated in a number of time slots corresponding to the plurality of receivers; a time-dividing device for time-dividing the optical signal received from the optical transmitter, wherein the optical signal is time-divided for a receiver by bending the signal with the time-dividing device at the time slot corresponding to the receiver so the receiver can receive the bent optical signal, wherein the bent optical signal includes information just for the receiver.

A further understanding of the nature and advantages of the invention herein may be realized by reference of the remaining portions in the specifications and the attached drawings.

DETAILED DESCRIPTION OF THE INVENTION

Figure 1:
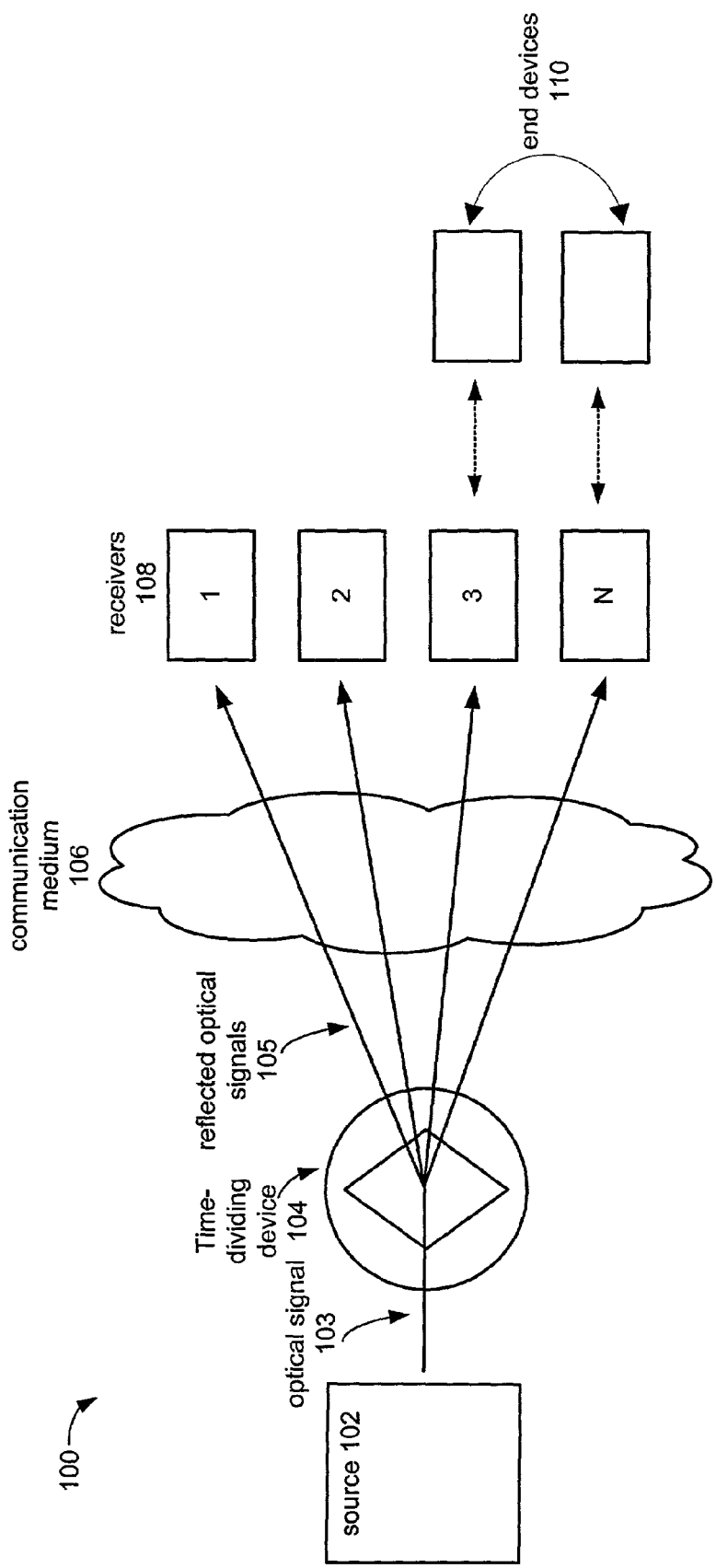
FIG. 1 illustrates a system for time-dividing an optical signal according to one embodiment.

FIG. 1 illustrates a system 100 for time-dividing an optical signal according to one embodiment. As shown, system 100 includes a source 102, an optical signal 103, a time-dividing device 104, a communication medium 106, receivers 108, and end devices 110.

Source 102 may be any source capable of transmitting optical signal 103. For example, source 102 is a laser and/or microwave laser (Maser). In one embodiment, source 102 emits a high bit rate optical signal. The high bit rate optical signal may be classified as optical carrier (OC)-3, OC-12, OC-48, or OC-192, or any other optical speed of classification. Using a high bit rate signal source and dividing its signal in time slots corresponding to different receivers has the advantage of having only one transmitting source, an ordinarily expensive part of the optical communication path, and having several time-dividing devices and receivers, which are typically cheaper elements. Preferably, source 102 emits one optical signal; however, source 102 may emit multiple signals or combine multiple signals (such as several wavelengths of a wave division multiplexed signal) that may be used to service different groups of receivers. In one embodiment, optical signal 103 is digital data such as TV signals, video signals, voice signals.

Time-dividing device 104 may be any device capable of time-dividing optical signal 103 from source 102 and sending optical signal 103 to different receivers 108 at different time slots. For example, time-dividing device 104 time-divides optical signal 103 by bending optical signal 103 by reflection and/or refraction at certain time slots. Examples of time-dividing devices are catadioptric devices, gratings, rotating mirrors, and optical switching devices. Time-dividing device 104 may be capable of reflecting optical signal 103, capable of refracting optical signal 103, or capable of both reflecting and refracting optical signal 103. For discussion purposes, reflection and/or refraction may be used interchangeably but it will be understood that reflection and/or refraction may be used to bend optical signal 103.

A catadioptric device is a device composed of a plurality of mirrors, prisms, and other optical devices that use the reflecting and/or refracting properties of optical signals for a specific purpose. Also, in one embodiment, a rotating mirror may be implemented by a mirror that rotates on an axis to bend optical signal 103 at different angles. The rotating mirror may bend optical signal 103 by either a continuous motion or by stopping at certain points. If the rotating mirror operates with a continuous motion, receivers 108 preferably are enabled to receive a range of angles of bent optical signal 103. The optical switching device may be any other device capable of time-dividing optical signal 103. For example, optical switching device may be made of material capable of reflecting and/or refracting optical signal 103 when a voltage is applied to the optical switching device.

Time-dividing device 104 operates by bending optical signal 103 at different angles during different time periods. At different times, optical signal 103 is reflected to different receivers designated to receive optical signal 103 during the designated time period. Thus, a receiver designated to receive optical signal 103 during the designated time period receives only information in the signal designated for the receiver. As shown, reflected optical signals 105 are reflected by time-dividing device 104 to receivers 108.

Communication medium 106 may be any medium capable of carrying reflected optical signals 105 to receivers 108. For example, communication medium 106 is an optical fiber or an over-the-air link.

Receivers 108 may be any receiver capable of receiving reflected optical signals 105. For example, receivers 108 are base stations or nodes, modems, over-the-air optical transmitters, RF transmitters, etc. Base stations or nodes may be, for example, base stations or nodes in a cellular network or optical network. Modems may be, for example, DSL modems, cable modems, set top boxes, etc.

Receivers 108 may be the final destination of reflected optical signals 105 or receivers 108 may receive the reflected signal and transmit the signal further downstream to devices, such as end devices 110. Examples of end devices 110 are base stations or nodes, modems, over-the-air optical transmitters, RF transmitters, etc. There is no limit to the number of times the signal is transmitted further downstream. Also, it is possible that receivers 108 and end devices 110 may include an embodiment of time-dividing device 104 to further time-divide reflected optical signal 105 in one embodiment. In another embodiment, receivers 108 and end devices 110 are optical receivers capable of decoding optical signal 103.

Figure 2:
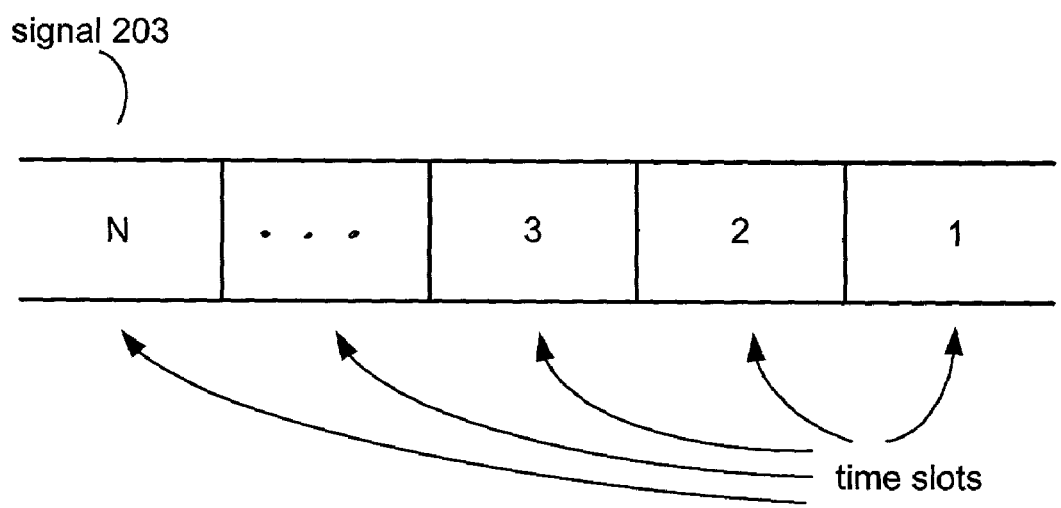
FIG. 2 illustrates an embodiment of optical signal.

FIG. 2 illustrates an embodiment of optical signal 103. As shown, optical signal 103 is allocated into a number of time slots 1, 2, 3, . . . , N. Each time slot includes information for a receiver 1–N during a period of time. For example, time slot 1 includes information for receiver 1, time slot 2 includes information for receiver 2, . . . , and time slot N includes information for receiver N.

Time-dividing device 104 reflects optical signal 103 at different angles for the time slots 1–N. Time-dividing device 104 may be synchronized so optical signal 103 is reflected to different receivers for each time slot. Thus, during time slot 1, time-dividing device 104 reflects optical signal 103 to receiver 1, during time slot 2, time-dividing device 104 reflects optical signal 103 to receiver 2, . . . , and during time slot N, time-dividing device 104 reflects optical signal 103 to receiver N. Thus, receivers 1–N receive the full optical signal transmitted from source 102. The full signal is reflected at different time slots to corresponding receivers 1–N. Additionally, each receiver 1–N does not receive information for other receivers and thus, splitting of information for other receivers at the receiver end is not necessary. Because receivers receive information intended for it, information for other receivers is not received by a receiver and thus, information is securely transmitted between the multiple receivers. Additionally, the full signal or full power of the signal is sent to a receiver enabling source 102 to transmit the full signal farther and faster.

Figure 3:
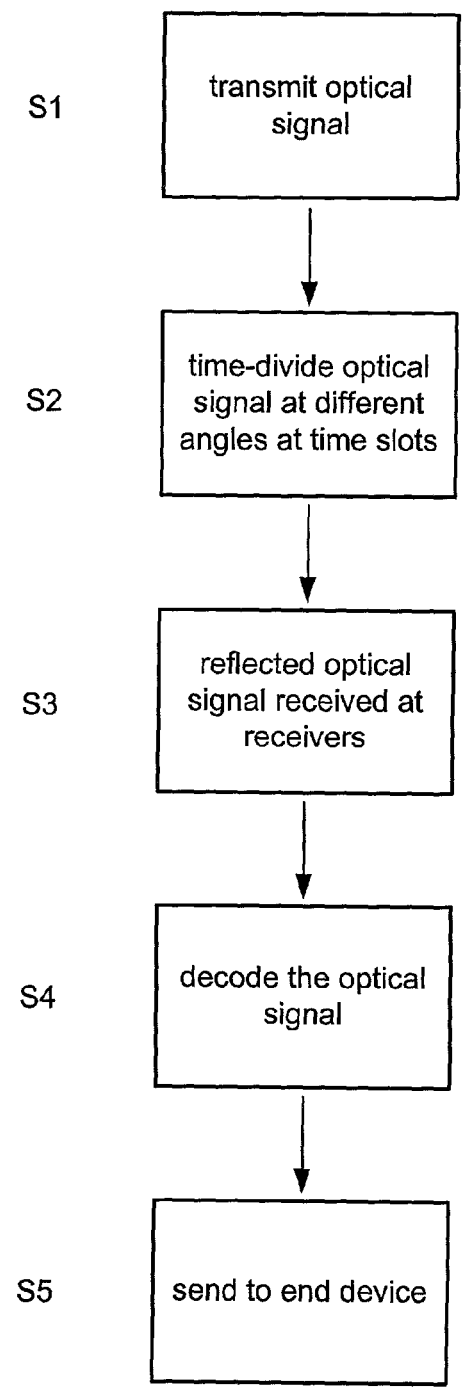
FIG. 3 illustrates a method for time-dividing an optical signal according to one embodiment.

FIG. 3 illustrates a method for time-dividing an optical signal according to one embodiment. In step S1, source 102 emits optical signal 103. Optical signal 103 is time-divided between receivers 1–N. Thus, at time slots 1–N, optical signal 103 is designated for receivers 1–N.

In step S2, time dividing device 104 time-divides optical signal 103. In one embodiment, time-dividing device 104 reflects optical signal 103 at different angles during the designated time slots. Thus, during time slot 1, time dividing device 104 reflects optical signal 103 at an angle where receiver one receives reflected optical signal 105. Additionally, in time slot 2, time dividing device 104 reflects optical signal 103 at an angle where receiver two receives reflected optical signal 105 during time slot 2. The process is repeated for all time slots.

In step S3, reflected optical signal 105 travels through communication medium 106 to receivers 108 during each time slot. In step S4, receivers 1–N decode reflected optical signal 105. In step S5, receivers 108 may transmit the signal to end device 110.

In one embodiment, a reverse-path transmitter system may be included in system 100. For example, receivers 108 may include individual reverse-path transmitters that transmit a return signal through the same path that optical signal 103 and reflected optical signal 105 were received through. Also, an independent path may be followed in transmitting a return signal to a receiver at source 102.

Figure 4:
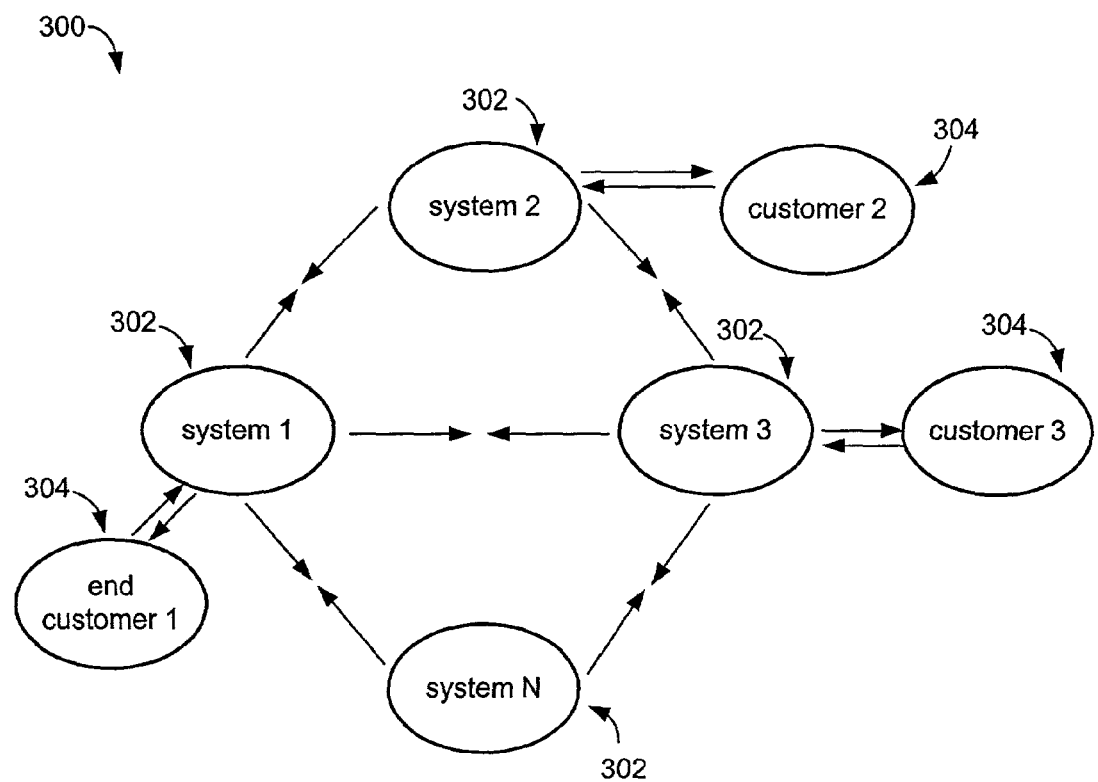
FIG. 4 illustrates an embodiment of a mesh network using systems for time-dividing an optical signal according to one embodiment.

In an alternative embodiment, FIG. 4 illustrates a mesh system 300 implemented using multiple systems for time-dividing an optical signal. As shown, mesh system 300 includes multiple systems 302 and multiple end customers 304. Systems 302 are denoted as systems 1-N and any number of systems may be included in mesh system 300 and end customers 304 are denoted as customers 1-N and any number of customers may be included in mesh system 300.

Systems 1-N may include a time-divided optical system 100 as described in FIG. 1. Additionally, systems 1-N include a receiver for receiving an optical signal. As shown, system 1 includes four systems that an optical signal may be time-divided between, system 2, system 3, system N, and customer 1 receive time-divided portions of an optical signal sent from system 1. Additionally, system 3 transmits a time-divided optical signal to system 1, system 2, system N, and customer 3. System 2 transmits a time-divided optical signal to customer 2, system 1, and system 3. System N transmits a time-divided optical signal to system 1 and system 3.

End customers 304 are designed as receivers 108 or end device 110. Customer 304 may also include a transmitter to transmit a return signal to a system 302.

Using mesh system 300, nodes of system 300 may transmit a time-divided optical signal to multiple nodes and end customers. Thus, systems 302 include one optical transmitter and one receiver. Thus, multiple transmitters are not needed to transmit to different nodes of mesh system 302. Additionally, systems 302 do not need a reverse path transmitter for all reverse paths. The reverse path is performed by the multiple forward links of the time-divided optical system. Accordingly, a source is not needed for each point to point transmission.

In one embodiment, system 100 may be used for wireless broadband access using an over-the-air link or for wireline broadband access using optical fibers. System 100 provides a point to multi-point optical link over the air or through optical fibers that may be used for broadband data communications. The use of a high bit rate signal and the transmission of the full signal to receivers allows system 100 to transmit optical signals over a long distance and at higher speeds than with a high bit rate signal. Additionally, system 100 provides a low cost solution for providing broadband communications.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A system for time-dividing an optical signal for a plurality of receivers comprising:
    an optical transmitter for transmitting the optical signal, wherein the optical signal includes a plurality of sections corresponding to a number of time slots, each section corresponding to a receiver in the plurality of receivers, and wherein the optical transmitter comprises a microwave source; and
    a catadioptric device for time-dividing the optical signal received from the optical transmitter,
    wherein the optical signal is time divided for different receivers by bending the signal at different angles with the catadioptric device at different time slots corresponding to different receivers, wherein each receiver receivers the section corresponding to the receiver, wherein the section of the bent optical signal includes information just for the receiver.

2. The system of claim 1, further comprising an end device, wherein the bent optical signal is transmitted to the end device from the receiver.

3. The system of claim 1, wherein the catadioptric device is a reflective device.

4. The system of claim 1, wherein the catadioptric device is a refractive device.

5. The system of claim 1, wherein the optical transmitter comprises a laser.

6. The system of claim 1, wherein the section of the bent optical signal received includes substantially all of the full optical signal transmitted from the optical transmitter.

7. A system for time-dividing an optical signal for a plurality of receivers comprising:
    an optical transmitter for transmitting the optical signal, wherein the optical signal includes a plurality of sections corresponding to a number of time slots, each section corresponding to a receiver in the plurality of receivers, and wherein the optical transmitter comprises a radio frequency source, and
    a catadioptric device for time-dividing the optical signal received from the optical transmitter,
    wherein the optical signal is time divided for different receivers by bending the signal at different angles with the catadioptric device at different time slots corresponding to different receivers, wherein each receiver receivers the section corresponding to the receiver, wherein the section of the bent optical signal includes information just for the receiver.

8. A method for time dividing an optical signal for a plurality of receivers, the optical signal including a plurality of sections corresponding to the plurality of receivers, the method comprising:
    transmitting the optical signal; and
    bending the optical signal at a plurality of angles at a plurality of time slots, wherein sections of the optical signal correspond to different receivers, wherein the optical signal is bent at different angles at different time slots so receivers corresponding to the section can receive the section, wherein the section of the bent optical signal includes information just for the receiver, and wherein bending the optical signal comprises both reflecting and refracting the optical signal,
    wherein the plurality of receivers are coupled with a plurality of end devices, and wherein the plurality of end devices is distributed throughout a wireless network.

9. The method of claim 8, further comprising transmitting the bent optical signal to an end receiver.

10. The method of claim 8, wherein the section of the bent optical signal received includes substantially all of the full optical signal transmitted.

11. The system of claim 8, wherein the wireless network is a mesh network.

12. A method for time-dividing an optical signal for a plurality of receivers, the optical signal including a plurality of sections corresponding to the plurality of receivers, the method comprising:
    transmitting the optical signal; and
    time-dividing the optical signal at a plurality of time slots, wherein sections of the optical signal correspond to different receivers, wherein the optical signal is bent at different angles at different time slots so receivers corresponding to the section can receive the section, wherein the bent optical signal includes information just for the receiver, and wherein time-dividing the optical signal comprises both reflecting and refracting the optical signal,
    wherein the plurality of receivers are coupled with a plurality of end devices, and wherein the plurality of end devices is distributed throughout a wireless network.

13. The method of claim 12, further comprising transmitting the bent optical signal to an end receiver.

14. The method of claim 12, wherein the section of the bent optical signal received includes substantially all of the full optical signal transmitted.

15. The system of claim 12, wherein the wireless network is a mesh network.

16. A system for time-dividing an optical signal for a plurality of non-collocated receivers in a wireless network, the system comprising:
    an optical transmitter for transmitting the optical signal, wherein the optical signal includes a plurality of sections corresponding to a number of time slots, each section corresponding to a receiver in the plurality of receivers; and
    a catadioptric device for time-dividing the optical signal received from the optical transmitter,
    wherein the optical signal is time divided for different receivers by bending the signal at different angles with the catadioptric device at different time slots corresponding to different receivers, wherein each receiver receivers the section corresponding to the receiver, wherein the section of the bent optical signal includes information just for the receiver.

17. The system of claim 16, further comprising an end device, wherein the bent optical signal is transmitted to the end device from the receiver.

18. The system of claim 16, wherein the optical transmitter comprises a laser.

19. The system of claim 16, wherein the optical transmitter comprises a microwave source.

20. The system of claim 16, wherein the wireless network is a mesh network.

* * * * *